(12) United States Patent
Kaag

(10) Patent No.: US 10,411,826 B2
(45) Date of Patent: Sep. 10, 2019

(54) DYNAMIC LIGHT CHANNEL

(71) Applicant: SIGNIFY HOLDING B.V., Eindhoven (NL)

(72) Inventor: Bjorn Christiaan Wouter Kaag, Heerlen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/776,990

(22) PCT Filed: Nov. 15, 2016

(86) PCT No.: PCT/EP2016/077703
§ 371 (c)(1),
(2) Date: May 17, 2018

(87) PCT Pub. No.: WO2017/089175
PCT Pub. Date: Jun. 1, 2017

(65) Prior Publication Data
US 2018/0331778 A1    Nov. 15, 2018

(30) Foreign Application Priority Data
Nov. 26, 2015 (EP) .................................... 15196425

(51) Int. Cl.
*H04J 14/02* (2006.01)
*H04B 10/116* (2013.01)
*H04B 10/114* (2013.01)

(52) U.S. Cl.
CPC ........ *H04J 14/0257* (2013.01); *H04B 10/116* (2013.01); *H04B 10/1149* (2013.01)

(58) Field of Classification Search
CPC . H04B 10/116; H04B 10/1149; H04J 14/0257
(Continued)

(56) References Cited

U.S. PATENT DOCUMENTS 5,059,871 A    10/1991  Pearlman et al.
8,233,806 B2 *  7/2012  Kitaji ................. H04B 10/1149
                                                         398/118
(Continued)

FOREIGN PATENT DOCUMENTS

WO    2014085128 A1    6/2014

OTHER PUBLICATIONS

Ye-Sheng Kuo et al, "System Architecture Directions for a Software-Defined Lighting Infrastructure", VLCS'14, Sep. 7, 2014, Maui, Hawaii, USA.ACM 978-1-4503-3067—Jan. 14, 2009 http://dx.doi.org/10.1145/2643164.2643166.

*Primary Examiner* — Amritbir K Sandhu
(74) *Attorney, Agent, or Firm* — Daniel J. Piotrowski

(57) ABSTRACT

The invention relates to an apparatus, system and method for communicating data from a source node unit communicatively coupled with the lighting actuator to a data end node unit wirelessly via light waves. The lighting actuator comprises a network interface to receive a temporary data path definition assigning the lighting actuator as selected data injection unit for embedding data from the source node unit into light waves for emission to 5 the data end node unit and a light channel configuration to be applied, and a configuration module configured to assign a light channel to the data end node unit according to a light channel configuration stored on the lighting actuator, wherein data communication addressed to the data end node unit and received in accordance with the temporary data path definition is forwarded to the data end node unit using the assigned light channel.

13 Claims, 5 Drawing Sheets

(58) Field of Classification Search
USPC .................................. 398/43, 45, 67–72, 100
See application file for complete search history.

(56) References Cited

U.S. PATENT DOCUMENTS

| | | | | |
|---|---|---|---|---|
| 8,380,081 | B2* | 2/2013 | Kim | H04B 3/542 |
| | | | | 398/154 |
| 9,054,799 | B2* | 6/2015 | Park | H04B 10/116 |
| 9,603,225 | B2* | 3/2017 | Thijssen | H05B 37/0254 |
| 10,039,172 | B2* | 7/2018 | Nolan | G08C 17/02 |
| 2003/0009263 | A1 | 1/2003 | Watkins | |
| 2006/0157559 | A1* | 7/2006 | Levy | G06K 17/00 |
| | | | | 235/380 |
| 2009/0269073 | A1* | 10/2009 | Kitaji | H04B 10/1149 |
| | | | | 398/130 |
| 2010/0034540 | A1* | 2/2010 | Togashi | H04B 10/116 |
| | | | | 398/118 |
| 2011/0069957 | A1* | 3/2011 | Kim | H04B 3/542 |
| | | | | 398/75 |
| 2013/0136457 | A1 | 5/2013 | Park et al. | |
| 2013/0148020 | A1 | 6/2013 | Cook | |
| 2014/0255038 | A1* | 9/2014 | Richards, IV | H04B 10/116 |
| | | | | 398/118 |
| 2014/0265927 | A1* | 9/2014 | Mohan | G05D 27/02 |
| | | | | 315/297 |
| 2015/0124625 | A1 | 5/2015 | Aldrin et al. | |
| 2015/0147067 | A1* | 5/2015 | Ryan | H04B 10/116 |
| | | | | 398/118 |
| 2015/0163881 | A1* | 6/2015 | Pederson | H05B 33/0863 |
| | | | | 315/154 |
| 2015/0372753 | A1* | 12/2015 | Jovicic | H04B 10/116 |
| | | | | 398/172 |
| 2016/0197676 | A1* | 7/2016 | Dong | G01S 11/12 |
| | | | | 398/172 |
| 2016/0366751 | A1* | 12/2016 | Xu | H05B 37/02 |
| 2018/0006723 | A1* | 1/2018 | Noh | H04B 10/116 |
| 2018/0331778 | A1* | 11/2018 | Kaag | H04B 10/1149 |

* cited by examiner

DYNAMIC LIGHT CHANNEL

CROSS-REFERENCE TO PRIOR APPLICATIONS

This application is the U.S. National Phase application under 35 U.S.C. § 371 of International Application No. PCT/EP2016/077703, filed on Nov. 15, 2016 which claims the benefit of European Patent Application No. 15196425.1, filed on Nov. 26, 2015. These applications are hereby incorporated by reference herein.

FIELD OF THE INVENTION

The invention relates to the field of data communication via light waves, in particular the invention relates to lighting actuators that dynamically assign light channels to data communication requests addressed to a particular end node unit.

BACKGROUND OF THE INVENTION

In wired communication systems, like for example wired Ethernet, data is provided to an end node unit via the data path given by a cable connecting the end node unit's network interface and a data forwarding device on the communication network. In state of the art wireless communication systems, RF signals are used for data communication between an end node unit and data forwarding device on the communication network. Although RF signals can be transmitted through walls, a sufficient number of wireless RF access points is required to guarantee that a user will obtain a proper connection to the communication network. However, a dense distribution of RF transceivers will occupy bandwidth in the spectrum, effectively limiting bandwidth available to each connected end node unit.

A new type of communication networks is emerging, where the communication is performed by light waves. Light sources may be used to transmit data to a receiver. The light waves may be visible or invisible to the human eye. A major difference to RF signalling is that light signals are line-of-sight-connections that will be obstructed by obstacles such as walls. A light source may be a lighting device normally used for ambient lighting of a space in a building, also known as Visible Light Communication (i.e. VLC). Since VLC's main objective is high quality ambient lighting, the data transmit rates are rather limited. Light sources primarily used for ambient lighting are therefore slow data transmission devices. In order to achieve higher transmission data rates data transmission light sources that are not primarily tailored at ambient lighting may be used alternatively or in addition. Examples are for instance—but not limited to—emitters using changes in light levels (on, off, dimming, colours), using multiple colours simultaneously (e.g. RGBW), a laser source or IR or UV sources. These latter examples work best with a specific receiver, such as for example an optimized photo detector.

Light emitters may be connected to a power delivering Power over Ethernet (PoE) switch using wired data ports (i.e. RJ45) as shown in FIG. 1.

An automated computer network can dynamically forward data between ports on a wired Ethernet switch using dynamical data communication path definitions. One example for implementing such dynamical data communication path definitions is a protocol such as e.g. OpenFlow or VxLan.

In order to prepare a devices used in a VLC system for data communication requires a separate protocol. With increasing network density and increasing data transfer to multiple (mobile) receivers a dynamic configuration of VLC emitters is required to offer data to the respective (mobile) receiver.

US 2011/069957 A1 discloses a method and system for light channel assignment. In order to determine an available light channel, an end-user device receives a beacon message from a light emitter to coordinate time synchronization with the light emitter and to search for an available wavelength channel. In response to the beacon message the end uses unit constructs available wavelength channel information and transmits an initial request to the light emitter. Thus, channel allocation is negotiated between the respective right emitter and the end user unit. With increasing density of the end-user devices the amount of traffic needed for negotiating a light channel will increase which limits the scalability of the system.

US 2009/026 9073 A1 discloses a similar approach in which a position estimation unit detects movement of the end-user device using photoreceivers. The light emitting device is configured to adjust the light source to be used for data transmission to the end-user device in order to avoid wasteful use of light sources which cannot reach the end-user device effectively. The light channel optimization is again dealt with in an autonomous manner at the light injection unit which complicates or limits coordination of light channel assignment in dense networks.

US 2013/0136457 A1 relates to systems for wireless light communication and is dedicated to preventing interference of optical signals in areas covered by at least two light emitting devices. In order to prevent that a data signal using an optical signal wirelessly transmitted to an end user device interferes with another signal using the same light channel in an area covered by to light emitting devices, different light channels are assigned to light emitters partly covering the same area. The light channel assignment of a respective light emitter is influenced by the channel assignment of neighboring light emitters.

SUMMARY OF THE INVENTION

It is an object of the present invention to provide an improved data communication between a source node unit and an end node unit using VLC lighting actuators that scales well with increased density of the end node units and lighting actuators.

The objective is achieved by the lighting actuator, system and method in accordance with the independent claims.

In an aspect of the present invention there is provided a lighting actuator for communicating data from a source node unit communicatively coupled with the lighting actuator to a data end node unit wirelessly via light waves, wherein the lighting actuator comprises a network interface to receive a temporary data path definition assigning the lighting actuator as selected data injection unit for embedding the data from the source node unit into light waves for emission to the data end node unit, and a configuration module configured to assign a light channel to the data end node unit according to a light channel configuration stored on the lighting actuator, wherein the data communication addressed to the data end node unit and received in accordance with the temporary data path definition is forwarded to the data end node unit using the assigned light channel.

By providing dynamic links between the data path definitions and the selected light channels, known protocols to control data communication within wired or wireless RF networks, such as e.g. OpenFlow or VxLan, and selected light channel protocols may be used to effectively define dynamic data paths to data end node units. A light channel may be realized as any means allowing respective data transmissions to be distinguished, for instance, by a unique frequency or intensity level. A lighting fixture may have one or more light sources. In case of two and more light sources each light source may be assigned to a respective light channel or all light sources may be assigned to a single light channel. Any intermediate assignment of N light sources to a light channel may also be realized. A light source may also be assigned to more than one light channel. The lighting actuator may either comprise a light emitter or a light detector for unidirectional data communication or both to enable bi-directional data communication with the data end node unit. Furthermore, the lighting actuator may be a hybrid lighting and data communication device usable for ambient lighting as well as for data communication or it may be a lighting actuator specifically dedicated to data communication.

The network interface is further configured to receive a light channel configuration to be applied for data communication with the data end node unit. A lighting actuator may have a default light channel configuration implemented during production by e.g. the manufacturer which can also serve as fallback configuration after a reset. However, the channel configuration may be altered during commissioning or operation to adapt the configuration to application specific requirements.

In an embodiment of the present invention the lighting actuator further comprises a light detector to receive data embedded in light waves from the data end node unit.

In an embodiment of the present invention the data end node unit is a first data end node unit and the light channel is a first light channel. The network interface is configured to receive a second temporary data path definition assigning the lighting actuator as selected data injection unit for embedding second data from a source node unit into light waves for emission to the second data end node unit. The light channel configuration comprises light channel configuration data for the second data end node unit. The configuration module is configured to (i) assign a second light channel to the second data end node unit according to the light channel configuration, wherein the data communication received in accordance with the second temporary data path definition is forwarded to the data end node unit using the assigned second light channel, the second light channel being different from the first light channel; or (ii) assign the first light channel to the second data end node unit according to the light channel configuration, wherein the data communication received in accordance with the first and second temporary data path definition is multiplexed and forwarded to the first and second data end node unit using the assigned first light channel In case of having two data end node units served at least temporarily by a single lighting actuator, it has to be ensured that the respective data is correctly submitted to the respective data end node units. For instance, in case two data end node units comprised in respective mobile devices carried around by two different persons whose paths cross, there might be a situation in which the same lighting actuator is closest to both mobile devices and thus may be selected for data injection for the first as well as the second data. To ensure that each mobile device receives the correct data, different data channels are assigned to each data end node unit for respective communications, e.g. by selecting a unique frequency, dimming level etc. Alternatively, the same lighting channel may be used for data emission to both data end node units and the first and second data may be multiplexed on the same lighting channel.

In an embodiment of the present invention the lighting actuator is configured to transmit information to the respective data end node units indicative of an encoding scheme applied to the data. The data end node unit typically knows how to extract the data. However, in order to apply a respective encoding scheme, the data end node unit needs to be informed which encoding scheme is to be applied. The system may therefore transmit information to said receiving data end node unit to explain how the data is transmitted, such as for example multiplexing (e.g. OFDM) or special modulation techniques (e.g. VPPM, CSK, OOK).

In an embodiment of the present invention the lighting actuator further comprises one or more light sources for emitting light to a light detector communicatively coupled to a data end node unit. A single light source may be exploit for data transmission using changes in light levels (on, off, dimming, colours), A single or multiple light sources may be used to enable transmission of multiple colours simultaneously (e.g. multi colour LEDs, such as RGBW). Further light sources may be a laser source or IR or UV sources which preferably require corresponding detection unit at the receiving side. In order to select a suitable light channel for data transmissions to a particular data end node unit, the control unit will have to take the receiving capabilities of the data end node unit into account.

In an aspect of the present invention there is provided a system for communicating data embedded in light waves to a data end node unit, comprising one or more lighting actuators according to any of the preceding claims; and a control unit for dynamically assigning light channel configurations associated with respective data path definitions to the one or more lighting actuators in accordance with an application control plan.

An application control plan provides an application specific context to the respective lighting actuators within an application control system. Based on usage patterns, which may be defined or learned during operation for instance by self-learning mechanisms, an application control plan may define one or more application control scenes which may define particular modes of operation for a variety of lighting actuators as well as their interactions. As a simple example, a lighting control system for respective rooms of a building may apply different application scenes for day and night. Wherein at night only a minimal set of lights may be activated by a corresponding presence detector, e.g. to provide enough light for the night guard, the same presence detector may trigger full illumination using all lights present in a room during day time. Hence, the application control plan provides context based on usage patterns to the control mechanisms applied in an application control system, thereby allowing system optimizations, for instance with respect to energy savings. Application control components that will not be required for a known period of time, may be switched to a power saving mode in accordance with the application control scenes defined by the application control plan. The context provided by the application control plan may also be used to determine a suitable lighting actuator for data transmission, either with respect to the availability of the lighting actuator as such, e.g. determination whether the lighting actuator is on/off, but also with respect to its availability for data communication, e.g. the lighting actuator might be extensively used for primary illumination purposes and thus not be suitable for efficient data communication.

In a further aspect of the invention there is provided a method for communicating data from a source node unit to a data end node unit, wherein the source node unit is communicatively coupled to a lighting actuator capable of embedding the data into light waves receivable by the data end node unit. The method comprises the steps of receiving a temporary data path definition assigning the lighting actuator as selected data injection unit for embedding data from the source node unit into light waves for emission to the data end node unit and assigning a light channel to the data end node unit according to a light channel configuration stored on the lighting actuator, wherein data communication addressed to the data end node unit and received in accordance with the temporary data path definition is forwarded to the data end node unit using the assigned light channel and receiving a light channel configuration to be applied for data communication with the data end node unit.

In an embodiment of the present invention the data end node unit is a first data end node unit and the light channel is a first light channel. The method further comprises receiving a second temporary data path definition assigning the lighting actuator as selected data injection unit for embedding second data from a source node unit into light waves for emission to the second data end node unit. The light channel configuration further comprises light channel configuration data for the second data end node unit; and the method further comprises (i) assigning a second light channel to the second data end node unit according to the light channel configuration, wherein the data communication received in accordance with the second temporary data path definition is forwarded to the data end node unit using the assigned second light channel, the second light channel being different from the first light channel; or (ii) assigning the first light channel to the second data end node unit according to the light channel configuration, wherein the data communication received in accordance with the first and second temporary data path definition is multiplexed and forwarded to the first and second data end node units using the assigned first light channel.

In an embodiment of the present invention the method further comprises transmitting information to the respective data end node units indicative of an encoding scheme applied to the data.

In an embodiment of the present invention the method further comprises receiving data from the data end node unit embedded in light waves.

In an embodiment of the present invention the light channel is a channel defined by a predetermined frequency, a predetermined number of light sources within a light fixture, a predetermined intensity level of the light signal or a combination thereof.

In a further aspect of the invention there is provided a computer program executable in a processing unit of a lighting actuator capable of embedding data into light waves receivable by a data end node unit, the computer program comprising program code means for causing the processing unit to carry out a method as defined in claims 8-12 when the computer program is executed in the processing unit.

It shall be understood that the lighting actuator of claim 1, the system for communicating data embedded in light waves according to claim 7 and the method of claim 8 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Some embodiments are exemplary described in the context of lighting control applications as preferred embodiments. However, it is to be understood that the embodiments are not restricted to lighting control applications. The person skilled in the art will appreciate that the methods and devices may be exploited for any other control application requiring a similar system topology.

In the following a software defined application (SDA) system provides knowledge about application specific requirements and instructions as stipulated in an application plan. For instance, an example of an SDA system is a software defined lighting (SDL) system that defines a lighting plan comprising one or more lighting scenes. A lighting scene may for example define dependencies or interactions between application control components, e.g. which lamps are to be switched on if a particular sensor is triggered. The lighting scenes may be defined for specific timeslots, such a day or night, weekdays, weekends, and so on.

A network management system such as—but not limited to—a software defined networking (SDN) system provides knowledge about the respective network components present in a mesh network and may control configuration of forwarding tables and the like. However, the network management system is only controlled on network system level and does not know about application specific connections between certain network components.

Together an SDA system and a network management system constitute a software defined control (SDC) system which combines both layers (application and network). The SDC system maps the application/lighting components onto the network topology and thus has the knowledge to decide which network components or component parts are required by an applicant scene. This enables efficient resource management since the SDC may switch off network components or components parts without degrading the capability of the (lighting) control network to execute a (lighting) application.

Figure 1:
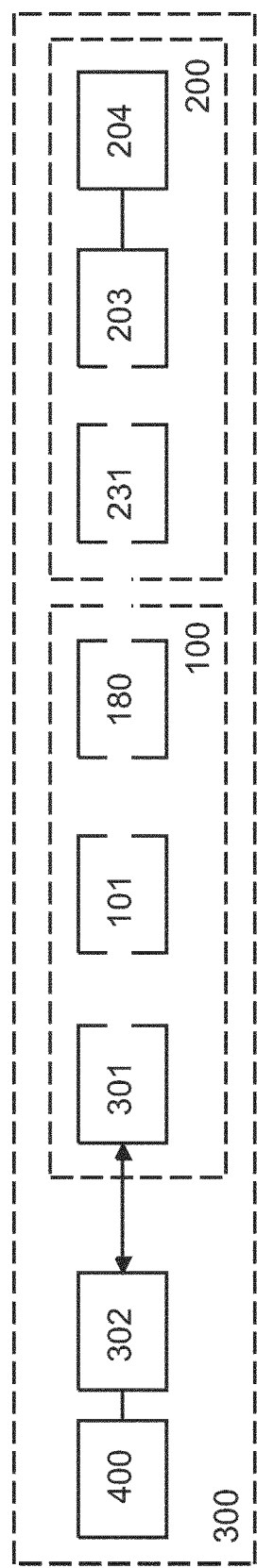
FIG. 1 shows a domain model of an application control system capable of data communication via light waves.

FIG. 1 shows a domain model of the application control system 300, e.g. which may be a lighting control system An SDC system 200, subject to an application control plan 204 and the application scenes stipulated therein can consult a network management system 231 and dynamically configure communication paths 180 through a communication network 100 to a lighting control component 301 that is deemed suitable to emit data to a detector 302 of a receiving device 400.

Figure 2:
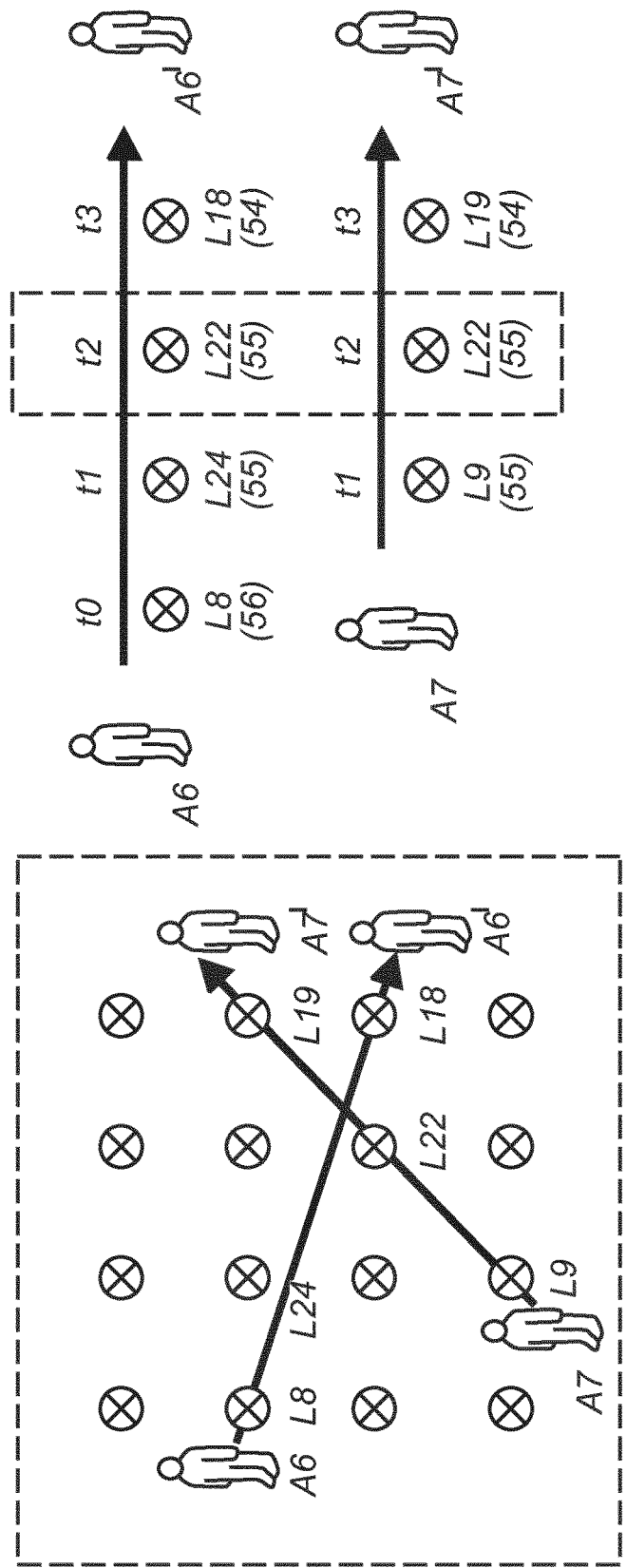
FIG. 2 shows a room with a plurality of light emitters and two mobile receivers carried by persons whose paths through the room cross.

As disclosed in detail in co-pending application (EP patent application 15196399.8), a control system such as—but not limited to—SDC system 200 applied within an application control network can determine the location of two mobile receivers within an area covered by the application control system. Based on velocity and direction information gathered by the control system, the control system can provide path predictions through the communication network underlying the application control system. The control system can furthermore determine if and where paths of two mobile receivers will cross. As illustrated in FIG. 2, a single lighting control component L22 may be required for data transmission via light emission to two mobile receiving devices A6 and A7. To discriminate different data transmissions for the respective mobile receivers, a unique light channel may be assigned to each mobile receiver dynamically.

Figure 3:
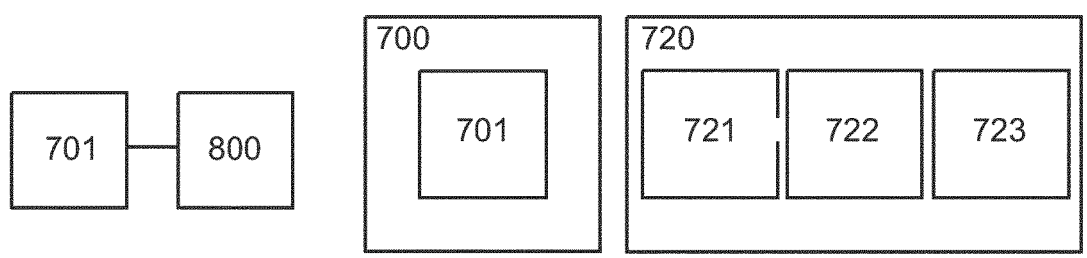
FIG. 3 shows examples of lighting fixtures with one or more light sources.

A light channel may realized as any means allowing respective data transmissions to be distinguished, for instance, by a unique frequency or intensity level. As indicated in FIG. 3 a lighting fixture 700, 720 may have one or more light sources 701, 721, 722, 723. In case of two and more light sources each light source 701 may be assigned to a respective light channel 800 or all light sources 721, 722, 723 may be assigned to a single light channel 800. Any intermediate assignment of N light sources 701, 721, 722, 723 to a light channel 800 may also be realized. A light source 701, 721, 722, 723 may also be assigned to more than one light channel 800. As an example, the lighting fixture may comprise 3 LEDs of different colour, read, green and blue. Each light channel may be assigned to one LED, further light channels could be defined by a combination of two LEDs etc. Alternatively or in addition the data for A6 and A7 may also be multiplexed on a single light channel using a suitable modulation scheme, e.g. ODFM, etc. The communication path definitions are subsequently linked to said light channels. The benefit is that a communication path definition facilitates dynamically programming data forwarding to a determined position (i.e. the emitter) under control of a network management system.

Figure 4:
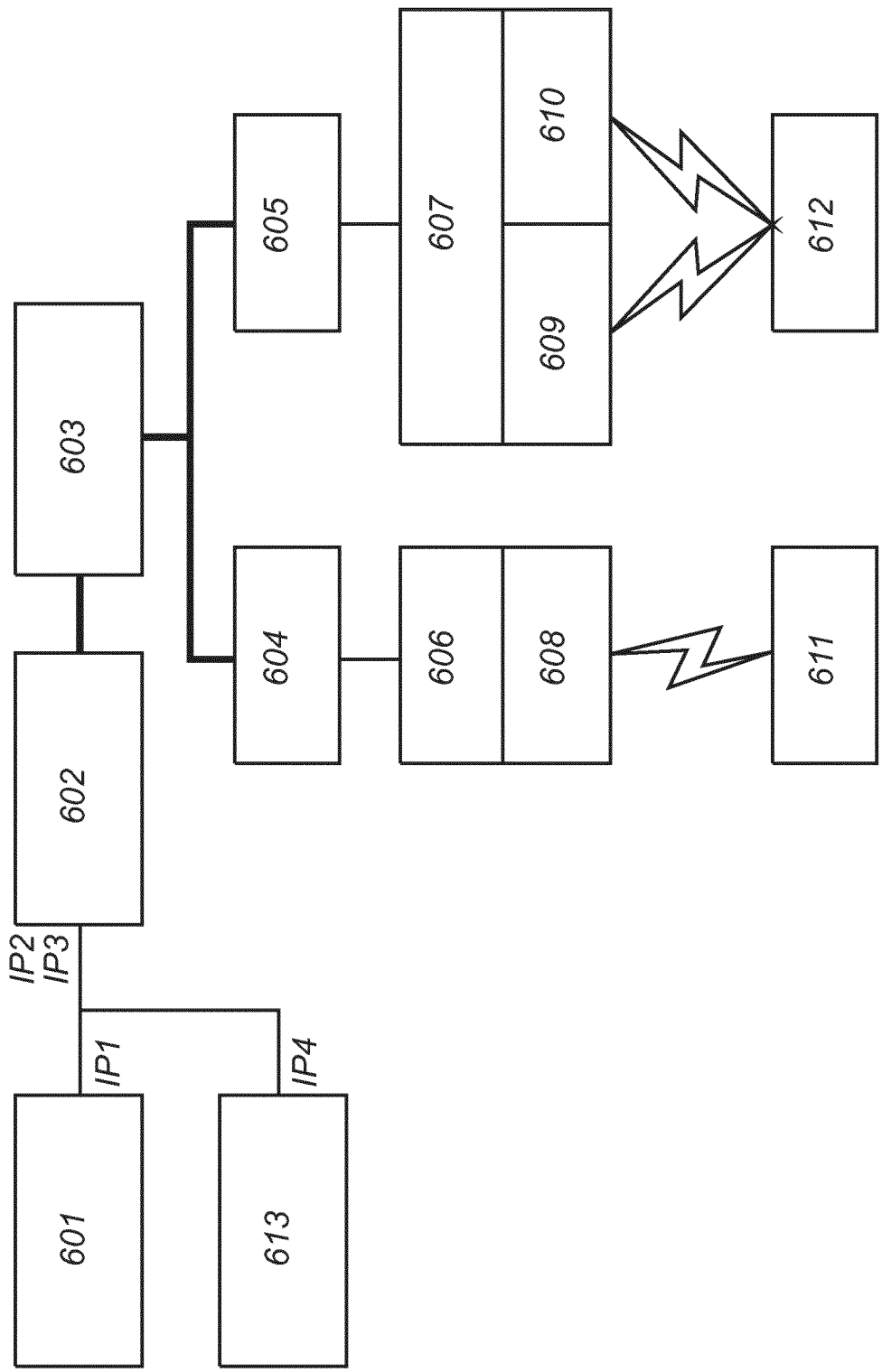
FIG. 4 shows a diagram of a data forwarding device using different light channels and FIG. 5 shows a system diagram of a lighting control network with automated light channel assignment.

FIG. 4 shows an end node unit 601, for example an SDA and/or SDL system, that may configure the light switch 603 with communication path definitions, transmitted via a network protocol connected to data port 602, to discriminate data for multiple mobile receivers, for example end node unit 611 and end node unit 612. Upon receipt of said communication path definitions, the light switch Si will link the data flow to respective light channels 606 and 607 via respective data ports 604 and 605, respectively. Via the light emitter 608 connected to data port 604 of data switch 603 data is communicated to mobile receiver 611 via light waves detected by the end node unit 611. Data port 605 is not only connected to emitter 609 but also to detector 610, thus allowing for bi-directional communication with end node unit 612.

Figure 5:
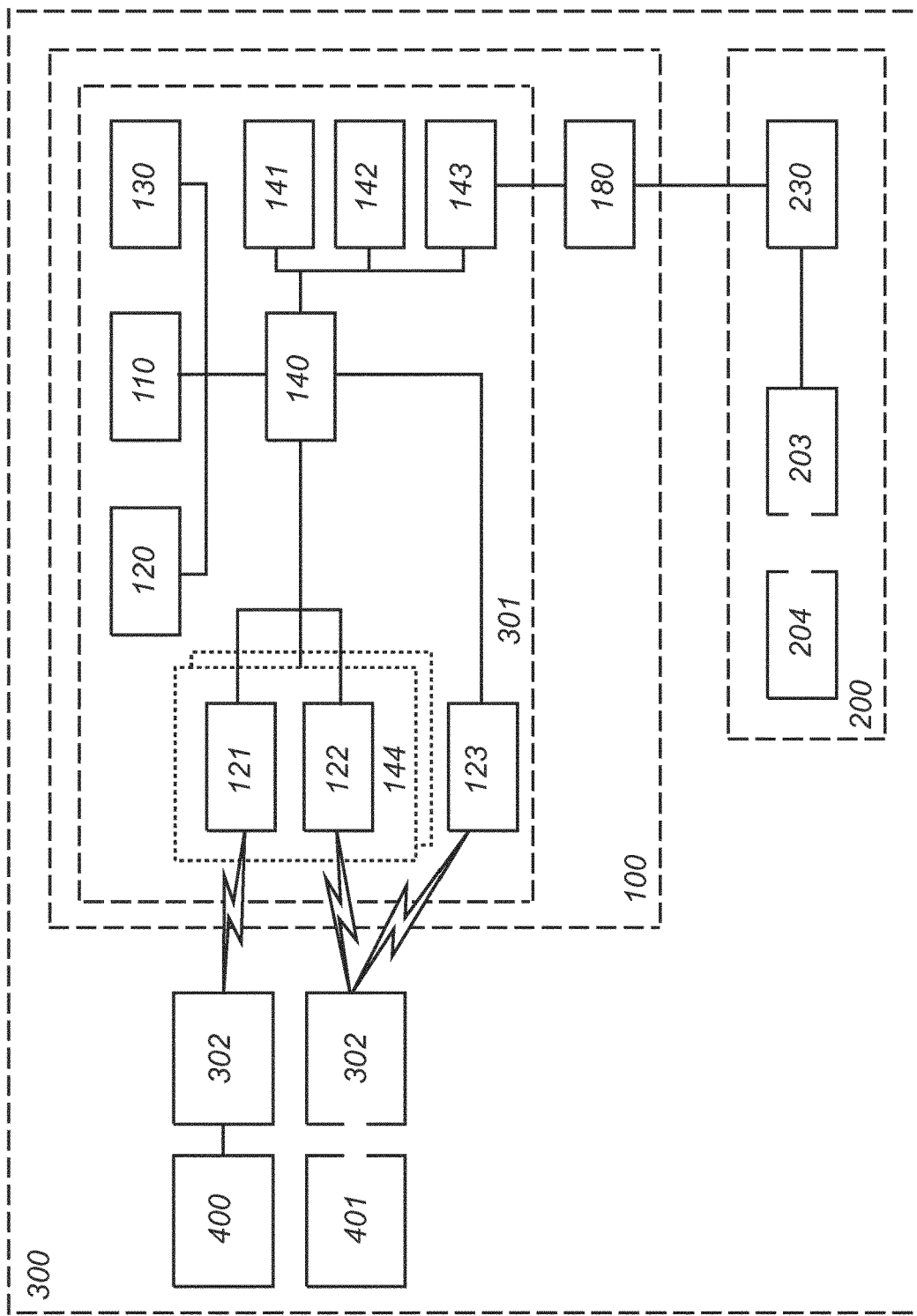

FIG. 5 shows a lighting control network 300 that may serve multiple mobile receivers which can interact with any lighting and communication actuator 301 as required and as may be stipulated in lighting plan 204. The light source(s) 144 are used to generate a required number of light channels 121 to including 122 whose emission can be detected by detectors 302 coupled to end node units 400 and 401, respectively. For bi-directional systems a photo detector 123 will detect emissions from end node unit 401. The configuration module 120 configures light channels in distinctive ways by assigning light channels to the respective end node units 400, 401. The southbound module 110 will run a data protocol for interconnection with the Software Defined Networking system 230 and/or the Software Defined Lighting system 203. The forwarding module 130 implements rules how to forward data between light channels. The modules 110, 120 and 130 may be implemented as software processes running on a micro-processor 140 using working memory 141 for execution and storage module 142 for saving computed results, as well as for storage of the firmware. Traffic between the Software Defined Lighting system 203 and other end node units is transported via a network path in between 180, which is under control of the Software Defined Networking system 230, selecting the "best" possible path through the communication network. The network sided interface 143 may be wireless (i.e. RF, VLC, FSO, etc.) or wired (cable Ethernet, fiber optics, etc.). The network path in between may comprise a router, gateway and/or another data forwarding component that works with filters to forward data from a network to light channels.

In the following a simple example is given to illustrate how the system links the lighting and communication actuator to a receiving end node unit. The SDC system initiates the match between the data stream and the receiving end node unit by sending commands to the emitter to configure a data path. Receiving end node unit X is positioned in the area of interest of lighting and communication actuator A, wherein lighting and communication actuator A shall have 1 light source (e.g. LED). The SDC system sends a data path definition for destination X to lighting and communication actuator A. Upon reception, the lighting and communication actuator assigns said data path definition to a light channel.

For example: receiving end node X is to use light channel #2, whereas light channel 2=LED 1, using a default static configuration profile "abc". When subsequent data to end node X is transmitted over the network, the SDN system will have programmed a data path from the source node unit to lighting and communication actuator A, and the lighting and communication actuator has executed the data path definition to configure an appropriate light channel to destination X.

If the SDC system observes that another receiving end node unit Y is or will be positioned in the area of interest of lighting and communication actuator A, the SDC system analyses multiple options, for example but not limited to:

1.) The lighting and communication actuator A configures light channel #2 to also support data transmissions to destination Y. In that case, the system needs to multiplex the data streams on light channel #2 for receiving end nodes units X and Y, e.g. using for example OFDM. The corresponding configuration is performed by the SDC system or a default method is used.

2.) The lighting and communication actuator A configures a new light channel #3 with different characteristics than light channel #2.

The decision which option to be taken is preferably made in view of an optimal configuration of the entire application system. The SDC system makes an appropriate decision and sends a data path definition to lighting and communication actuator A, for destination Y.

In case the lighting and communication actuator has multiple light sources (for example a lighting fixture with 4 light sources (e.g. LEDs)), the system has further options to define exclusive light channels.

In addition to a default, static configuration profile per lighting fixture, a dynamic configuration profile may be used, in which the plurality of lighting and communication actuators and how they work together are fine tuned into a constellation profile. A light fixture 1 may be configured with a first configuration profile and light fixture 2 with another second configuration profile by the SDC system, thereby overriding the default configuration profiles for a specified duration. As an example, a simple constellation of configuration profiles is shown below:

| Light fixture | Light source (e.g. LEDs) | Modulation | Codec | Light channel setup | Light channel count | Configuration profile |
|---|---|---|---|---|---|---|
| 1 | 4 | CSK | ODFM-x | 1 unique per LED | 4 | A |
| 2 | 2 | OOK | ODFM-y | 2 unique per LED | 4 | B |
| 3 | 4 | CSK | ODFM-x | 4 unique using one of the 4 LEDs | 4 | C |

As an example a more complex constellation of configuration profiles is shown as follows:

| Light fixture | Light source (e.g. LEDs) | Modulation | Codec | Light channel setup | Light channel count | Configuration profile |
|---|---|---|---|---|---|---|
| 1 | 4 | proprietary | proprietary | 1 unique per LED | 4 | F |
| 2 | 2 | proprietary | proprietary | 1 unique per LED | 2 | G |
| 3 | 4 | proprietary | proprietary | 1 unique per LED | 4 | F |

Wherein the above examples define the same configuration profiles for the light sources of the respective lighting fixtures, the configuration profiles may also define different configuration settings per light source. The SDC system manages a plurality of configuration profiles in a constellation profile.

The receiving end node unit is capable of decoding data transmitted via a light wave. The system, however, transmits information to said end node unit indicating how the data is transmitted, e.g. which encoding scheme is used. Many existing technologies can be used to enhance receiving data, such as for example multiplexing (e.g. OFDM) or special modulation techniques (e.g. VPPM, CSK, OOK).

An exemplary implementation may use logical identifiers (e.g. a logical channel IDs) linked to respective receiving end node units and channel configurations as well as optionally time slots in which the configuration should be applied.

| Channel ID | Receiving end node unit | Configuration | Time slot (optional) |
|---|---|---|---|
| 1 | A | X | t1-t2 |
| 2 | B | Y | t3-t4 |

A default channel map may be assigned to lighting actuators during production, based on e.g. an optimal configuration derived from offsite computations or research. This default configuration may also be used as fallback configuration if there is no dynamic configuration or the device is reset.

In a uni-directional lighting control network 300, where the control system only forwards data to receiving end node unit 400 using lighting and communication actuator 301 according to any of the preferred embodiments, the configuration information, e.g. in form of a channel map, may be provided to the receiving end node unit 400 periodically, either in an exclusive default light channel or in each and every light channel. Alternatively, the information could be fixed or entered via other means into the receiving device, for example via another connection (e.g. VLC, FSO, RF, RFID, etc.) when the mobile end node unit 400 is entering a respective space of a building.

In a bi-directional lighting control network, where the system can forward data to and receive data from receiving device 401, the receiving end node unit is enabled to find its data by consulting the channel configuration information, e.g. a channel map. Another method is to provide the information periodically, either in an exclusive default light channel or in each and every light channel.

Alternatively, the information on the channel configuration could be fixed or entered as a table via other means into the receiving device, for example via another connection (e.g. VLC, FSO, RF, RFID, etc.) when the mobile end node unit 401 is entering a respective space of said building.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these mea-

The invention claimed is:

1. A lighting actuator for communicating data from a source node unit communicatively coupled with the lighting actuator to a data end node unit wirelessly via light waves, wherein the lighting actuator comprises:
   a network interface to receive a first temporary data path definition assigning the lighting actuator to embed data from the source node unit into light waves for emission to the data end node unit and a light channel configuration assigning respective light channels to a respective data end node units including the data end node unit in accordance with an application control plan coordinating operation of a plurality of lighting actuators, and
   a processor to assign a light channel to the data end node unit according to the light channel configuration received by the lighting actuator, wherein data communication addressed to the data end node unit and received in accordance with the temporary data path definition is forwarded to the data end node unit using the assigned light channel.

2. The lighting actuator according to claim 1, further comprising a light detector (302) to receive data embedded in light waves from the data end-node unit.

3. The lighting actuator according to claim 1, wherein the data end node unit is a first data end node unit and the light channel is a first light channel, and wherein
   the network interface is configured to receive a second temporary data path definition assigning the lighting actuator for embedding second data from a source node unit into light waves for emission to the second data end node unit, and wherein
   the light channel configuration comprises light channel configuration data for the second data end node unit; and wherein
   the processor:
   (i) assigns a second light channel to the second data end node unit according to the light channel configuration, wherein the data communication received in accordance with the second temporary data path definition is forwarded to the data end node unit using the assigned second light channel, the second light channel being different from the first light channel; or
   (ii) assigns the first light channel to the second data end node unit according to the light channel configuration, wherein the data communication received in accordance with the first and the second temporary data path definition is multiplexed and forwarded to the first and the second data end node unit using the assigned first light channel.

4. The lighting actuator according to claim 3, further being configured to transmit information to the respective data end node units indicative of an encoding scheme applied to the data.

5. The lighting actuator according to claim 1, further comprising one or more light sources for emitting light to a light detector communicatively coupled to a data end node unit and/or wherein the lighting actuator comprises one or more light detectors for detecting light from a light emitter communicatively coupled to the data end node unit.

6. The lighting actuator according to claim 1, wherein the light channel is a channel defined by a predetermined frequency, a predetermined number of light sources within a light fixture, a predetermined intensity level of the light signal or a combination thereof.

7. A system for communicating data embedded in light waves to a data end node unit, comprising
   one or more lighting actuators according to claim 1; and
   a controller to dynamically assigning light channel configurations associated with respective data path definitions to the one or more lighting actuators in accordance with an application control plan.

8. A method for communicating data from a source node unit to a data end node unit, wherein the source node unit is communicatively coupled to a lighting actuator capable of embedding the data into light waves receivable by the data end node unit, the method comprising:
   receiving a first temporary data path definition assigning the lighting actuator to embed data from the source node unit into light waves for emission to the data end node unit and a light channel configuration assigning respective light channels to a respective data end node units including the data end node unit in accordance with an application control plan coordinating operation of a plurality of lighting actuators;
   assigning a light channel to the data end node unit according to the light channel configuration received by the lighting actuator, wherein data communication addressed to the data end node unit and received in accordance with the first temporary data path definition is forwarded to the data end node unit using the assigned light channel.

9. The method according to claim 8, wherein the data end node unit is a first data end node unit and the light channel is a first light channel, the method further comprising:
   receiving a second temporary data path definition assigning the lighting actuator for embedding second data from a source node unit into light waves for emission to the second data end node unit, and wherein
   the light channel configuration further comprises the light channel configuration data for the second data end node unit; and
   (i) assigning a second light channel to the second data end node unit according to the light channel configuration, wherein the data communication received in accordance with the second temporary data path definition is forwarded to the data end node unit using the assigned second light channel, the second light channel being different from the first light channel; or
   (ii) assigning the first light channel to the second data end node unit according to the light channel configuration, wherein the data communication received in accordance with the first and the second temporary data path definition is multiplexed and forwarded to the first and the second data end node units using the assigned first light channel.

10. The method according to claim 8, further comprising transmitting information to the respective data end node units indicative of an encoding scheme applied to the data.

11. The method according to claim 8, further comprising receiving data from the data end node unit embedded in light waves.

12. The method according to claim 8, wherein the light channel is a channel defined by a predetermined frequency, a predetermined number of light sources within a light fixture, a predetermined intensity level of the light signal or a combination thereof.

13. A computer program executable in a processing unit of the lighting actuator embedding data into light waves receivable by a data end node unit, the computer program comprising instructions for the processing unit to carry out a method as defined in claim 8 when the computer program is executed in the processing unit.

* * * * *